United States Patent
Sun et al.

(10) Patent No.: US 12,513,712 B2
(45) Date of Patent: Dec. 30, 2025

(54) ENABLING MULTIPLE CELLS TO SCHEDULE A SPECIAL CELL

(71) Applicant: Apple Inc., Cupertino, CA (US)

(72) Inventors: Haitong Sun, Cupertino, CA (US); Chunxuan Ye, San Diego, CA (US); Dawei Zhang, Saratoga, CA (US); Hong He, San Jose, CA (US); Huaning Niu, San Jose, CA (US); Oghenekome Oteri, San Diego, CA (US); Seyed Ali Akbar Fakoorian, San Diego, CA (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 788 days.

(21) Appl. No.: 17/754,542

(22) PCT Filed: Apr. 6, 2021

(86) PCT No.: PCT/CN2021/085746
§ 371 (c)(1),
(2) Date: Apr. 5, 2022

(87) PCT Pub. No.: WO2022/213292
PCT Pub. Date: Oct. 13, 2022

(65) Prior Publication Data
US 2024/0064762 A1 Feb. 22, 2024

(51) Int. Cl.
*H04W 72/232* (2023.01)
*H04L 1/00* (2006.01)
*H04W 72/12* (2023.01)

(52) U.S. Cl.
CPC ......... *H04W 72/232* (2023.01); *H04L 1/0038* (2013.01); *H04W 72/12* (2013.01)

(58) Field of Classification Search
CPC .... H04W 72/232; H04W 72/12; H04L 1/0038
See application file for complete search history.

(56) References Cited

U.S. PATENT DOCUMENTS

2019/0349155 A1* 11/2019 Xu .............. H04L 5/0042
2020/0337029 A1* 10/2020 Yi .............. H04W 72/23
(Continued)

FOREIGN PATENT DOCUMENTS

| CN | 111602441 | 8/2020 |
| CN | 111903170 | 11/2020 |
| CN | 112262540 | 1/2021 |

OTHER PUBLICATIONS

Huawei et al., "Remaining issues on SCell dormancy behaviour", 3GPP TSG RAN WGI Meeting #110, R2-2005241, May 22, 2020, 6 sheets.

*Primary Examiner* — Jackie Zuniga Abad
(74) *Attorney, Agent, or Firm* — Fay Kaplun & Marcin, LLP (57) ABSTRACT

A user equipment (UE) is connected to a special cell (SpCell) that is configured to schedule the SpCell and a secondary cell (SCell) that is configured to schedule the SpCell. The UE determines a number of blind decodes (BDs) and a number of control channel elements (CCEs) that may be configured for the SpCell and monitors a physical downlink control channel (PDCCH) for downlink control information (DCI) scheduling the SpCell that is transmitted by the SpCell and DCI scheduling the SpCell that is transmitted by the SCell.

20 Claims, 6 Drawing Sheets

(56) References Cited

U.S. PATENT DOCUMENTS

| | | | |
|---|---|---|---|
| 2021/0037607 A1* | 2/2021 | Hamidi-Sepehr | H04W 24/08 |
| 2022/0109597 A1* | 4/2022 | Takeda | H04L 1/0038 |
| 2022/0304026 A1* | 9/2022 | MolavianJazi | H04L 5/001 |
| 2023/0070761 A1* | 3/2023 | Kim | H04W 72/0446 |

* cited by examiner

| Table 500 Column 505 | | Column 530 Overbooking Not Permitted | Column 540 Overbooking Permitted on SCell | Column 550 Overbooking Permitted |
|---|---|---|---|---|
| Example 510<br>SCell 120B: BD: 24, CCE: 32<br>SpCell 120A: BD: 24, CCE: 32 | | Example 510<br>Not Allowed | Example 510<br>Allowed | Example 510<br>Allowed |
| Example 515<br>SCell 120B: BD: 32, CCE: 64<br>SpCell 120A: BD: 24, CCE: 32 | | Example 515<br>Not Allowed | Example 515<br>Allowed | Example 515<br>Allowed |
| Example 520<br>SCell 120B: BD: 24, CCE: 32<br>SpCell 120A: BD: 32, CCE: 64 | | Example 520<br>Not Allowed | Example 520<br>Not Allowed | Example 520<br>Allowed |

ENABLING MULTIPLE CELLS TO SCHEDULE A SPECIAL CELL

TECHNICAL FIELD

This application relates generally to wireless communication systems, and in particular relates to enabling multiple cells to schedule a special cell.

A user equipment (UE) may connect to a variety of different networks or types of networks. When connected, the UE may be configured with a special cell (SpCell) and a secondary cell (SCell). It has been identified that it may be beneficial if both the SpCell and the SCell were capable of scheduling the SpCell. However, implementing this feature raises UE complexity concerns.

SUMMARY

Some exemplary embodiments are related to a processor of a user equipment (UE) configured to perform operations. The operations include determining that the UE is connected to a special cell (SpCell) that is configured to schedule the SpCell and a secondary cell (SCell) that is configured to schedule the SpCell, determining a number of blind decodes (BDs) and a number of control channel elements (CCEs) that may be configured for the SpCell and monitoring a physical downlink control channel (PDCCH) for downlink control information (DCI) scheduling the SpCell that is transmitted by the SpCell and DCI scheduling the SpCell that is transmitted by the SCell.

Other exemplary embodiments are related to a user equipment (UE) having a transceiver configured to communicate with a network and a processor communicatively coupled to the transceiver and configured to perform operations. The operations include determining that the UE is connected to a special cell (SpCell) that is configured to schedule the SpCell and a secondary cell (SCell) that is configured to schedule the SpCell, determining a number of blind decodes (BDs) and a number of control channel elements (CCEs) that may be configured for the SpCell and monitoring a physical downlink control channel (PDCCH) for downlink control information (DCI) scheduling the SpCell that is transmitted by the SpCell and DCI scheduling the SpCell that is transmitted by the SCell.

DETAILED DESCRIPTION

The exemplary embodiments may be further understood with reference to the following description and the related appended drawings, wherein like elements are provided with the same reference numerals. The exemplary embodiments relate to a deployment scenario in which both a special cell (SpCell) and a secondary cell (SCell) are capable of scheduling the SpCell. As will be described in more detail below, implementing this type of functionality provides a network operator with more flexibility with regard to scheduling and thus, may improve network performance. However, from the perspective of a user equipment (UE), multiple cells being able to schedule a single cell raises complexity concerns. The exemplary techniques described herein provide an adequate balance of network side scheduling flexibility and UE implementation complexity.

The exemplary embodiments are described with regard to a UE. However, reference to the term UE is merely provided for illustrative purposes. The exemplary embodiments may be utilized with any electronic component that is configured with the hardware, software, and/or firmware to exchange information (e.g., control information) and/or data with the network. Therefore, the UE as described herein is used to represent any suitable electronic device.

The exemplary embodiments are also described with regard to dynamic spectrum sharing (DSS) between a long term evolution (LTE) radio access technology (RAT) and 5G NR RAT. Those skilled in the art will understand that DSS generally refers to the deployment of multiple RATs in the same frequency bands and the dynamic allocation of spectrum resources between those RATs. DSS may enable a network carrier to deploy 5G NR on top of the spectrum already being used for LTE. However, when multiple RATs share the same frequency band, a collision may occur between the signals of the different RATs. This may cause performance degradation on the UE side and/or the network side for both LTE and 5G NR operations.

In accordance with various regulations and/or standards, DSS may be configured to ensure that LTE operations are not impacted by the presence of 5G NR communications in the same band. To provide an example, for a 5G NR UE, physical downlink control channel (PDCCH) reception may include rate matching around LTE cell specific reference signal (CRS). These types of mechanisms ensure backwards compatibility for legacy LTE UEs and allow the RATs to coexist in the same spectrum. However, due to the requirements placed on 5G NR, the network carrier's options for implementing certain signaling techniques or channel configurations may be limited under conventional circumstances.

In addition, the exemplary embodiments are described with regard to a scenario in which the UE is configured with multiple serving cells. Throughout this description, reference is made to various different types of cells. Those skilled in the art will understand that each of these different types of cells are defined in third generation partnership program (3GPP) Specifications. The cells described herein are to be configured and behave in the manner in which defined in the 3GPP Specifications. In addition, the exemplary techniques enable both a SpCell and an SCell to schedule the SpCell.

To provide a general overview of the cells relevant to the examples referenced herein, consider the following exemplary scenario for dual-connectivity (DC). The UE may support DC to a primary cell group (PCG) and a secondary cell group (SCG). The PCG may include at least one primary node (PN) and the SCG may include at least one secondary node (SN).

The nodes of the cell groups may be further characterized by their roles within their respective cell group. For example, the PCG may comprise a primary cell (PCell) and zero or more secondary cells (SCells). The PCell and the SCells of the PCG may utilize carrier aggregation (CA) technology. Thus, the greater the number of SCells configured in the PCG, the higher the maximum possible bandwidth or data rate that may be achieved by the PCG. The SCG may comprise a primary secondary cell (PSCell) and zero or more SCells. Similarly, the PSCell and the SCells of the SCG may utilize CA technology. Thus, the greater the number of SCells configured in the SCG, the higher the maximum possible bandwidth or data rate that may be achieved by the SCG. In accordance with the exemplary embodiments, the SCells in the PCG and the SCG may also be utilized to offload control signaling of the PCell or the PSCell.

The term "special cell (SpCell)" may refer to the PCell of the PCG or the PSCell of the SCG. Thus, the terms "SpCell," "MN" and "PCell" may be used interchangeably throughout this description. Further, the terms "SpCell," "SN" and "PSCell" may also be used interchangeably throughout this description. In addition, a SCell that is configured to schedule a SpCell may be referred to as a "special scheduling secondary cell (sSCell)." Thus, the terms "sSCell" and "SCell" may also be used interchangeably throughout this description. However, any reference to a particular type of cell is merely provided for illustrative purposes, different networks or entities may refer to similar concepts by a different name.

The SpCell may schedule its own downlink communications. For example, the SpCell may transmit downlink control information (DCI) over the PDCCH that schedules or indicates the transmission of subsequent data by the SpCell over the physical downlink shared channel (PDSCH). The exemplary embodiments relate to implementing techniques configured to support an SCell that is capable of scheduling the SpCell. For example, the SCell may also transmit DCI over the PDCCH that schedules or indicates the transmission of subsequent data by the SpCell over the PDSCH. Thus, in accordance with various exemplary techniques described herein, the SpCell may be scheduled by two different cells, itself and an SCell (e.g., sSCell).

As indicated above, DSS may implicate various regulations and/or standards. As a result, under conventional circumstances, it may be difficult to find a downlink signaling configuration that complies with the DSS requirements. It would be beneficial for the SCell to be able to schedule the SpCell because it would allow the network operator to offload a portion of the SpCell scheduling responsibilities to the SCell. This may improve network performance because it may improve the network operator's flexibility with regard to adapting to the wide array of different conditions surrounding actual deployment scenarios.

Some of these exemplary techniques are configured to balance the network operator's flexibility with regard to SpCell scheduling and the resources required by the UE to perform PDCCH reception. For example, some of the exemplary techniques described herein relate to implementing restrictions with regard to when or under what conditions an SCell would be permitted to schedule an SpCell. These restrictions enable an operator to satisfy DSS requirements and do not place unreasonable requirements on either the UE or the network. Although the exemplary embodiments are described with regard to providing benefits to DSS, the exemplary embodiments are not limited to DSS and may apply to any appropriate scenario in which a cell may schedule itself and be scheduled by another cell.

In one aspect, the exemplary embodiments relate to implementing blind detection (BD) and control channel element (CCE) configurations for deployment scenarios in which both the SpCell and the SCell are capable of scheduling the SpCell. These techniques relate to concepts such as, but not limited to, BD and CCE computation, overbooking and dropping BD/CCE occasions. In another aspect, the exemplary embodiments relate to how the SpCell may be considered for blind detection and CCE configurations in a CA deployment scenario in which both the SpCell and the SCell are capable of scheduling the SpCell. In a further aspect, the exemplary embodiments relate to implementing unicast DCI configurations for deployment scenarios in which both the SpCell and the SCell are capable of scheduling the SpCell. The exemplary techniques described herein may be used in conjunction with currently implemented DSS configurations, future implementations of DSS configurations or with any other appropriate mechanisms related to a cell that is configured to be scheduled by itself and one or more other cells.

Figure 1:
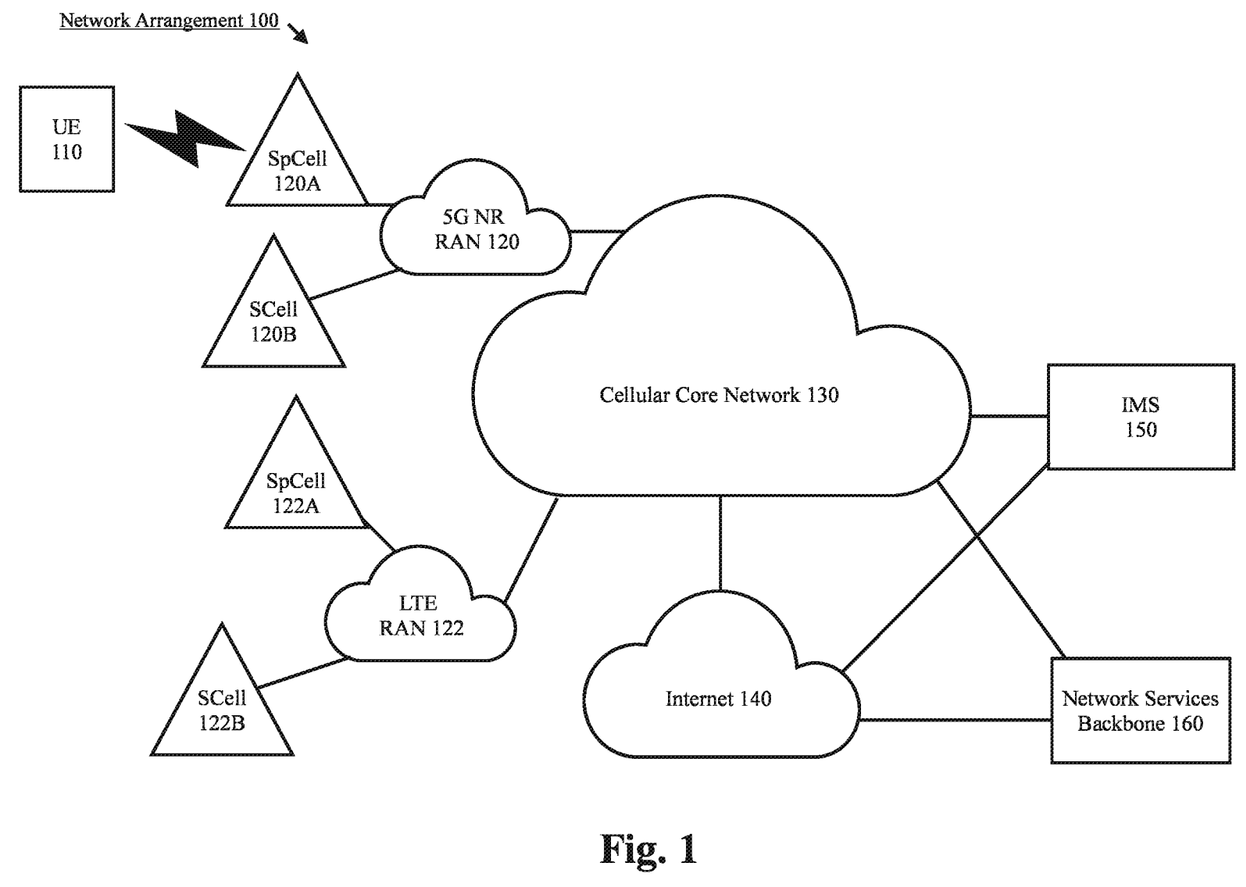
FIG. 1 shows an exemplary network arrangement according to various exemplary embodiments.

FIG. 1 shows an exemplary network arrangement 100 according to various exemplary embodiments. The exemplary network arrangement 100 includes the UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network arrangement 100, the network with which the UE 110 may wirelessly communicate is a 5G NR radio access network (RAN) 120 and an LTE RAN 122. However, the UE 110 may also communicate with other types of networks (e.g., 5G cloud RAN, a next generation RAN (NG-RAN), a legacy cellular network, a WLAN, etc.) and the UE 110 may also communicate with networks over a wired connection. With regard to the exemplary embodiments, the UE 110 may establish a connection with the 5G NR RAN 120 and/or the LTE RAN 122. Therefore, the UE 110 may have a 5G NR chipset to communicate with the NR RAN 120 and an LTE chipset to communicate with the LTE RAN 122.

The 5G NR-RAN 120 and the LTE-RAN 122 may be portions of cellular networks that may be deployed by cellular providers (e.g., Verizon, AT&T, T-Mobile, etc.). These networks 120 and 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

The cells 120A, 122A, 120B, 122B may include one or more communication interfaces to exchange data and/or information with camped UEs, other cells, the RANs 120, 122 the cellular core network 130, the internet 140, etc. Further, the cells 120A, 122A, 120B, 122B may include a processor configured to perform various operations. For example, the processor may be configured to perform operations related to DSS, configuring a cell group and scheduling a SpCell. However, reference to a processor is merely for illustrative purposes. The operations of the cells 120A, 122A, 120B, 122B may also be represented as a separate incorporated component of the cell or may be a modular component coupled to the node, e.g., an integrated circuit with or without firmware. For example, the integrated circuit may include input circuitry to receive signals and processing circuitry to process the signals and other information. In addition, in some cells, the functionality of the processor is split among two or more processors such as a baseband processor and an applications processor. The exemplary embodiments may be implemented in any of these or other configurations of a cell.

Those skilled in the art will understand that any association procedure may be performed for the UE 110 to connect to the 5G NR-RAN 120 and/or the LTE-RAN 122. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific cell. For access to LTE services, a similar association procedure may be performed with the LTE RAN 122. However, as mentioned above, reference to the 5G NR-RAN 120 and the LTE-RAN 122 is merely for illustrative purposes and any appropriate type of RAN may be used.

The exemplary embodiments are described with regard to a scenario in which the UE 110 is configured with a PCG and a SCG. In the arrangement 100, the 5G NR RAN 120 includes a SpCell 120A and a SCell 120B of the 5G NR RAN 120. The LTE RAN 122 includes a SpCell 122A of the LTE RAN 122 and a SCell 122B of the LTE RAN 122. The SpCells 120A, 120B may represent either a PCell of the PCG or a PSCell of the SCG. In this example, the SpCell 120A and zero or more of the SCells (e.g., 120B, 122B, etc.) may be configured as the PCG and the SpCell 122A and zero or more SCells (e.g., 120, 122B, etc.) may be configured as the SCG. However, the example shown in the arrangement 100 is merely provided for illustrative purposes and is not intended to limit the exemplary embodiments in any way. A cell group may be configured in a wide variety of different ways and may include any appropriate number of nodes. The exemplary techniques described herein apply to any scenario in which an SpCell and an SCell are configured to schedule the SpCell.

To provide a general example of DC within the context of the network arrangement 100, the UE 110 may be connected to both the 5G NR RAN 120 and the LTE RAN 122. However, reference to an independent 5G NR RAN 120 and an independent LTE-RAN 122 is merely provided for illustrative purposes. An actual network arrangement may include a RAN that includes architecture that is capable of providing both 5G NR RAT and LTE RAT services. For example, a next-generations radio access network (NG-RAN) (not pictured) may include a next generation Node B (gNB) that provides 5G NR services and a next generation evolved Node B (ng-eNB) that provides LTE services. The NG-RAN may be connected to at least one of the evolved packet core (EPC) or the 5G core (5GC). Thus, in one exemplary configuration, the UE 110 may achieve DC by establishing a connection to at least one cell corresponding to the 5G NR-RAN 120 and at least one cell corresponding to the LTE-RAN 122. In another exemplary configuration, the UE 110 may achieve DC by establishing a connection to at least two cells corresponding to the NG-RAN or any other type of similar RAN that supports DC. To provide another example of DC, the UE 110 may connect to one or more RANs that provide 5G NR services. For example, a NG-RAN may support multiple nodes that each provide 5G NR access, e.g., NR-NR DC. Similarly, the UE 110 may connect to a first RAN that provides 5G NR services and a second different RAN that also provides 5G NR services. Accordingly, the example of a single independent 5G NR-RAN 120 and a single independent LTE-RAN 122 is merely provided for illustrative purposes.

The network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. It may include the EPC and/or the 5GC. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
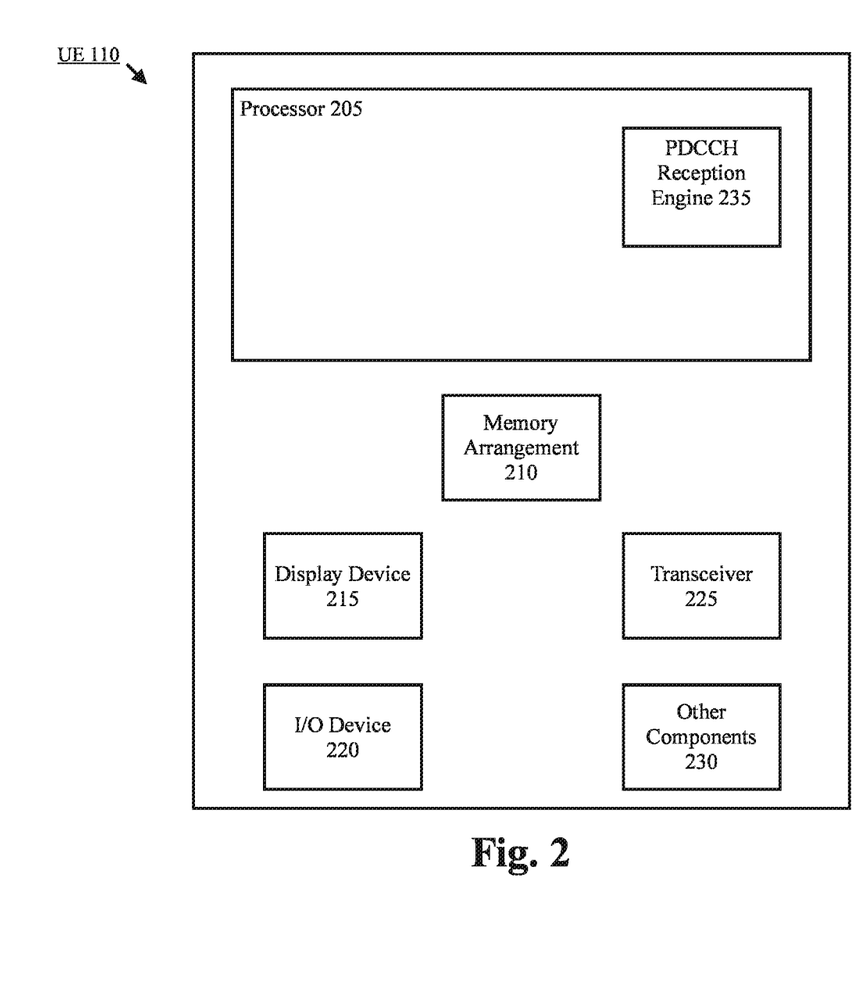
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute a plurality of engines of the UE 110. For example, the engines may include a PDCCH reception engine 235. The PDCCH reception engine 235 may perform various operations related to managing network configurations and receiving DCI scheduling a SpCell from the SpCell and a SCell.

The above referenced engine 235 being an application (e.g., a program) executed by the processor 205 is merely provided for illustrative purposes. The functionality associated with the engine 235 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, an LTE-RAN (not pictured), a legacy RAN (not pictured), a WLAN (not pictured), etc. Accordingly, the transceiver 225 may operate on a variety of different frequencies or channels (e.g., set of consecutive frequencies).

The exemplary embodiments relate to a deployment scenario in which an SCell is configured to schedule subsequent SpCell communications. As a result, communication with the SpCell may be scheduled by the SpCell itself and the SCell (e.g., sSCell). When both cells are capable of scheduling the SpCell, both cells may transmit control information corresponding to the SpCell over the PDCCH. Consequently, the UE 110 may have to monitor the PDCCH for control information from two different cells. As indicated above, this increases complexity on the UE 110 side.

For LTE, control information such as CRS may be transmitted with high time and frequency domain density. A 5G NR UE may rate match around LTE CRS to perform PDCCH reception. For 5G NR, the PDCCH may include a CORESET which refers to a set of time and frequency resources used to carry DCI. The resource elements (REs) of the CORESET may be characterized in RE groups (REGs) and REG bundles. Each REG may consist of multiple REs (e.g., 2, 6, 12, etc.) in one orthogonal frequency division multiplexing (OFDM) symbol and each REG bundle may consist of multiple REGs. In accordance with DSS, the 5G NR control information is intended be invisible to LTE UEs.

The PDCCH may be carried by a particular number of control channel elements (CCEs). For example, the PDCCH may be carried by 1, 2, 4, 8, 16 or any other appropriate number of CCEs. Each CCE may consist of multiple REGs (e.g., 6 or any other appropriate amount). For PDCCH transmission, CCE-to-REG mapping may be performed. However, CCE-to-REG mapping is beyond the scope of the exemplary embodiments.

On the UE 110 side, PDCCH reception may include monitoring PDCCH candidates. In some embodiments, this may include blindly decoding multiple PDCCH candidates in a search space. PDCCH monitoring and reception of CORESETs may require the UE 110 to take on a certain complexity and energy cost in exchange for scheduling flexibility and lower overhead on the network side. By configuring the SpCell to be scheduled by the SpCell itself and the SCell, the complexity on the UE 110 side increases because more blind decodes (BDs) and CCEs may be configured but the flexibility on the network side increases because control channel signaling may be offloaded to the SCell.

Figure 3:
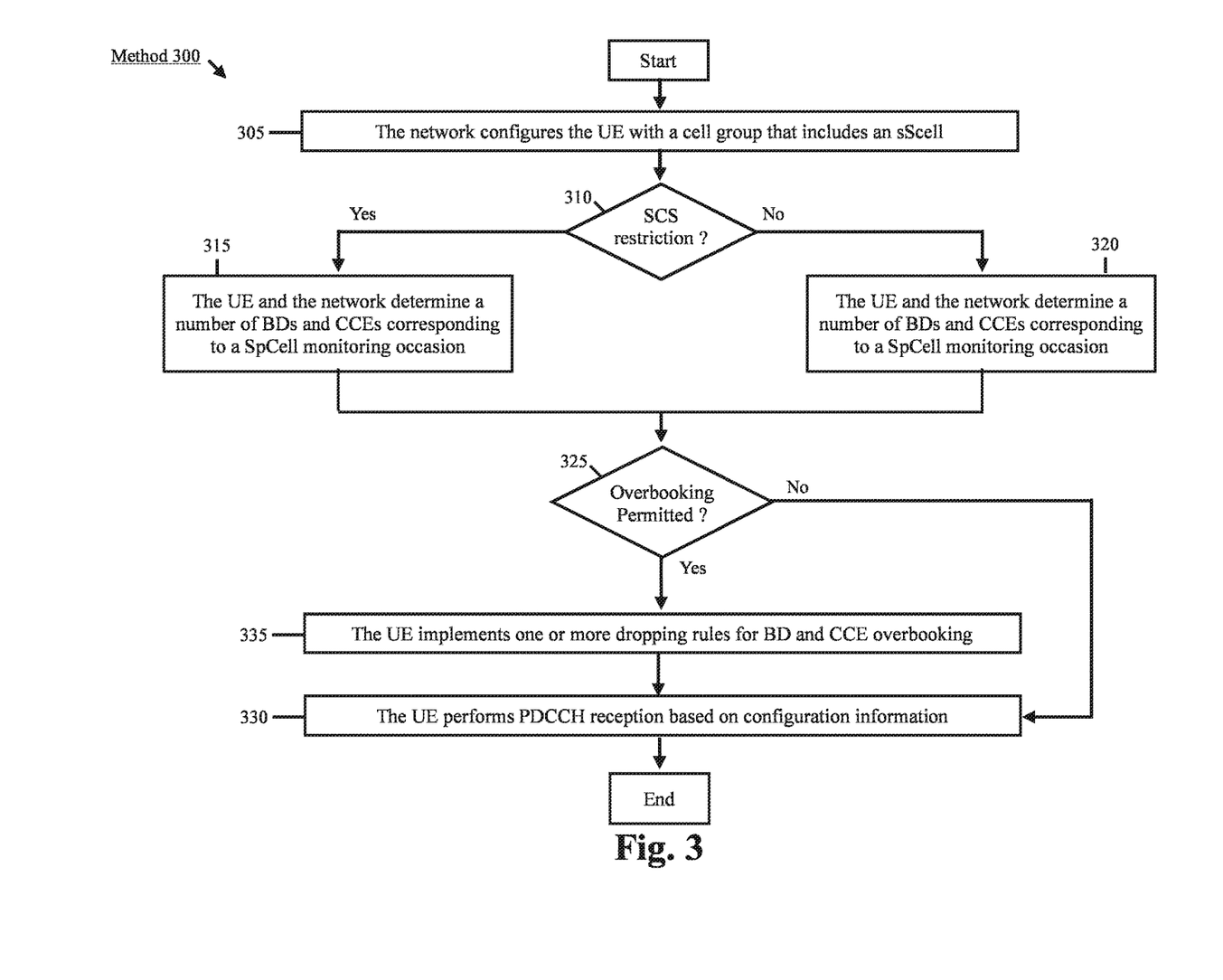
FIG. 3 shows a method for implementing a special cell (SpCell) that is configured to be scheduled by the SpCell and a secondary cell (SCell) according to various exemplary embodiments.

FIG. 3 shows a method 300 for implementing a SpCell that is configured to be scheduled by the SpCell and an SCell according to various exemplary embodiments. The method 300 is described with regard to the network arrangement 100 of FIG. 1 and the UE 110 of FIG. 2.

In 305, the network configures the UE 110 with a cell group that includes an sSCell. The description of the method 300 will be used to describe operations performed on the UE 110 side and the network side. The examples referenced below may be described with regard to a cell group (e.g., PCG or SCG) including the SpCell 120A and the SCell 120B, where the SCell 120B is configured as the sSCell. As mentioned above, the terms sSCell and SCell may be used interchangeably to refer to a SCell that is configured to schedule the SpCell. However, this exemplary scenario is provided for illustrative purposes and is not intended to limit the exemplary embodiments in any way. There are various different possible cell group configurations, and the exemplary embodiments may apply to any deployment scenario that includes an SpCell that is configured to be scheduled by the SpCell itself and an SCell.

Various signaling exchanges may be performed to establish the configuration of a cell group that includes the sSCell. For example, the UE 110 and the cell 120A may exchange information such as, but not limited to, capability information, radio resource control (RRC) messages and measurement reports to establish and/or maintain services such as DC, CA and the scheduling the SpCell via the SpCell or an SCell. This signaling may occur before and/or during instances in which the cell 120A may be considered an SpCell of the UE 110.

In 310, the UE 110 and the network consider whether the SpCell 120A and the SCell 120B are configured with a same sub-carrier spacing (SCS). In some exemplary embodiments, when sSCell functionality is enabled, the SCS of the SpCell 120A and the SCell 120B are required to be the same. This requirement may be hard encoded into the Standard or protocol such that UE 110 and the network know when the sSCell is enabled, the SpCell 120A and the sSCell 120B operate using the same SCS. Alternatively, or in addition to being hard encoded in the Standard or protocol, the SCS restriction may be selectively implemented by the network based on UE capability signaling or any other appropriate indication from the UE 110.

Some of the exemplary techniques described herein relate to implementing restrictions with regard to when or under what conditions an SCell may be permitted to schedule an SpCell. These restrictions enable an operator to achieve greater scheduling flexibility without placing an unreasonable requirement on the UE. The SCS restriction in 310 is an example of a restriction that when implemented within the context of the exemplary SpCell/sScell functionality described herein provides an opportunity for a reasonable tradeoff between network scheduling flexibility and UE implementation complexity.

If there is a SCS restriction, the method 300 continues to 315. In 315, the UE 110 and/or the network determine a number of BDs and CCEs corresponding to a SpCell monitoring occasion. Since there is an explicit or implied SCS restriction, the technique in 315 may be less complex to implement compared to the technique described below in 320.

Those skilled in the art will understand that there may be limitations on the UE 110 processing the PDCCH. As a result, for a particular monitoring occasion, the UE 110 may only be expected to perform a certain number of BDs on the PDCCH and/or process a certain number of CCEs for channel estimation. While the network configures the PDCCH candidates and/or the number of CCEs for channel estimation, the network considers the UE 110 limitation with regard to PDCCH reception.

In some exemplary embodiments, the number of BD decodes and CCEs may be hard encoded into the Standard or protocol such that the UE 110 and the network know that when the sSCell is enabled, the number of BDs (x) and the number of CCEs (y) for an SpCell monitoring occasion are a particular value when one or more conditions are present or are to be computed using a particular formula when one or more condition are present. Alternatively, or in addition to being hard encoded in the Standard or protocol, the number of BDs (x) and the number of CCEs (y) may be explicitly signaled to the network by the UE 110 (or vice versa) or a particular value or range of values for BD and CCE computation may be implicitly indicated by the UE 110 and/or the network.

In one example, the number of BDs and the number of CCEs for a SpCell monitoring occasion when both the SpCell 120A and SCell 120B are configured to schedule the SpCell 120A may be based on the sum of the total number of BDs and CCEs associated with the SpCell 120A and the SCell 120B. In another example, the number of BDs and CCEs for a SpCell monitoring occasion when both the SpCell 120A and SCell 120B are configured to schedule the SpCell 120A may be based on the number of BDs and CCEs associated with the cell that has a higher number of BDS/CCEs between the SpCell 120A and the SCell 120B. For instance, if X BDs are configured for the SpCell 120A and 2×BDs are configured for the SCell 120B, the number of BDs associated with the SCell 120B (e.g., 2×) may be utilized because between the SCell 120B has a higher number of BDs compared to the SpCell 120A.

In a further example, the number of BDs and the number of CCEs for a SpCell monitoring occasion when both the SpCell 120A and SCell 120B are configured to schedule the SpCell 120A may be based on the number of BDs and CCEs associated with the SpCell 120A regardless of the number of BDs/CCEs associated with the SCell 120B. In another example, the number of blind decodes (x) and the number of CCE (Y) for a SpCell monitoring occasion when both the SpCell 120A and SCell 120B are configured to schedule the SpCell 120A may be based on the number of BDs and CCEs associated with the SCell 120B regardless of the number of BDs/CCEs associated with the SpCell 120A.

Returning to 310, if there is no SCS restriction, the method 300 continues to 320. In 320, the UE 110 and/or the network determine a number of BDs and CCEs corresponding to the SpCell monitoring occasion. Since the SpCell 120A and the sSCell 120B may operate on different SCS, the techniques in 320 may be more complex to implement compared to the techniques described above in 315.

Similar to the techniques described above in 315, in 320, several different options are available to consider when computing BDs and CCEs associated with the SpCell monitoring occasion. In one example, the number of BDs and the number of CCEs for a SpCell monitoring occasion when both the SpCell 120A and SCell 120B are configured to schedule the SpCell 120A may be based on the sum of the total number of BDs and CCEs associated with the SpCell 120A and the SCell 120B. In another example, the number of BDs and CCEs for a SpCell monitoring occasion when both the SpCell 120A and SCell 120B are configured to schedule the SpCell 120A may be based on the number of BDs and CCEs associated with the cell that has a higher number of BDS/CCEs between the SpCell 120A and the SCell 120B. In a further example, the number of BDs and the number of CCEs for a SpCell monitoring occasion when both the SpCell 120A and SCell 120B are configured to schedule the SpCell 120A may be based on the number of BDs and CCEs associated with the SpCell 120A regardless of the number of BDs/CCEs associated with the SCell 120B. In another example, the number of blind decodes (x) and the number of CCE (Y) for a SpCell monitoring occasion when both the SpCell 120A and SCell 120B are configured to schedule the SpCell 120A may be based on the number of BDs and CCEs associated with the SCell 120B regardless of the number of BDs/CCEs associated with the SpCell 120A.

In some exemplary embodiments, when the number of BDs and CCEs in the SpCell monitoring occasion is based on the sum of the BDs and CCEs corresponding to the SpCell 120A and the SCell 120B and the SCS for each cell is not the same, there may be three options for BD and CCE computation. Like the techniques described in 315, the UE 110 and the network may be aware of the configured number of BDs and CCE for a monitoring occasion based on information hard encoded into the Standard and/or information exchanged between the UE 110 and the network (e.g., capability information, RRC messages, etc.).

Figure 4:
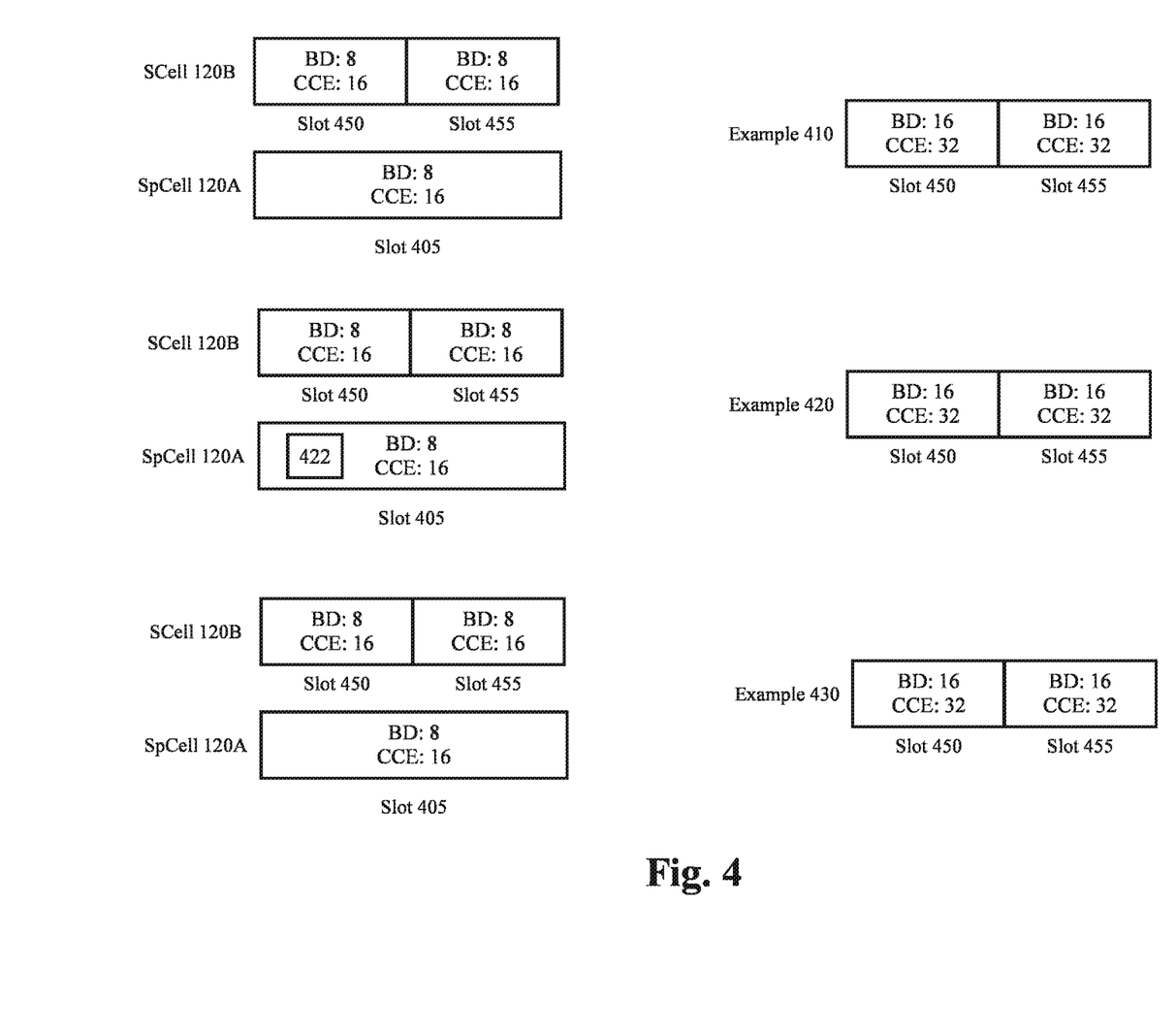
FIG. 4 shows three options for blind decode (BD) and control channel element (CCE) computation for a monitoring occasion when the SpCell and the SCell do not have the same subcarrier spacing (SCS) according to various exemplary embodiments.

FIG. 4 shows three options for BD and CCE computation for a monitoring occasion when the SpCell and the SCell do not have the same SCS. The UE 110 may be configured with a number of BDs and CCEs per SCell 120B monitoring occasion. The UE 110 may also be configured with a number of BDs and CCEs per SpCell 120A monitoring occasion. In FIG. 4, the SCell 120B is associated with 8 BDs and 16 CCEs per monitoring occasion (e.g., slot) and the SpCell 120A is associated with 8 BDs and 16 CCEs per monitoring occasion.

In these examples, it is assumed that the SCS for the SCell 120B is larger than the SCS for the SpCell 120A. To illustrate this difference, the slot 405 for the SpCell 120A is shown as being longer than the slots 450, 455 shown for the SCell 120B. Those skilled in the art will understand that a longer slot is associated with a smaller SCS and a smaller slot is associated with a larger SCS. The examples shown in FIG. 4 are merely provided for illustrative purposes and are not intended to limit the exemplary embodiments in any way.

In a first approach, the larger SCS (e.g., shorter slot) between the two cells may be used for BD and CCE computation when both the SpCell and the SCell are configured to schedule the SpCell. In this approach, the number of BDs and CCEs within the longer slot may be repeatedly counted in the shorter slots. The example 410 illustrates this approach. In the example 410, the UE 110 may perform PDCCH reception based the larger SCS (e.g., smaller slots 450, 455) and the sum of the BDs and CCEs associated with both the SpCell 120A and the SCell 120B. Thus, the slot 450 and the slot 455 are both shown to include 16 BDs and 32 CCEs.

As a result of the configuration shown in the example, 410, the UE 110 may perform PDCCH reception for SpCell scheduling information using a SCS configuration that is not actually being utilized by the SpCell 120A itself for downlink communications. This is because the PDCCH may include transmissions from both the SpCell 120A and the SCell 120B and thus, signaling aspects from both of the cells may be considered for PDCCH reception techniques.

In a second approach, in addition to the larger SCS, the presence of a search space may be considered for blind decode and CCE computation. For illustrative purposes, the slot 405 is shown to include a search space 422.

In this approach, the number of BDs and CCEs within the longer slot may be counted when a corresponding search space overlaps with one of the shorter slots. Otherwise, the number of BDs and CCE within the longer slot may not be considered for BD and CCE computation. The example 420 illustrates this approach. In the example 420, the UE 110 performs PDCCH reception based on a SCS associated with the larger SCS (e.g., smaller slots 450, 455). The sum of the BDs and CCEs associated with both the SpCell 120A and the SCell 120B may be used when a search space of the longer slot 405 overlaps with one of the shorter slots 450, 455. Thus, in the example 420, slot 450 is shown as being considered to include 16 BDs and 32 CCEs because the search space 422 overlaps with the slot 450. The slot 455 is shown as being considered to include only 8 BDs and 16 CCEs because there is no search space overlapping the slot 455.

In a third approach, the smaller SCS (e.g., longer slot) between the two cells may be used for BD and CCE computation when both the SpCell and the SCell are configured to schedule the SpCell. The example 430 illustrates this approach. In the example 430, the UE 110 performs PDCCH reception based on a SCS associated with the smaller SCS (e.g., longer slot 405) and the sum of the BDs and CCEs associated with both the SpCell 120A and the SCell 120B may be based on the total BDs and CCEs associated with all three slots (e.g., 405, 450, 455) because all three slots occur within the same monitoring occasion. Thus, in the example 430, the slot 405 is shown as including 24 BDs and 64 CCEs.

Returning to the method 300, after either 315 or 320, the method 300 continues to 325. In 325, the UE 110 and the network consider whether BD and CCE overbooking is permitted. Throughout this description, the term overbooking generally refers to a concept in which the network configures a number of BD candidates that exceed the computed number of BDs (e.g., a BD limit) and/or the network configures a number of CCEs that exceed a UE 110 capability (e.g., a CCE limit). Overbooking may increase the implementation complexity on the UE 110 side. The overbooking restriction in 325 is an example of a restriction that, when implemented, provides an opportunity for a reasonable tradeoff between network flexibility and UE complexity.

If overbooking is not permitted, the method 300 continues to 330. In 330, the UE 110 performs PDCCH reception based on the configuration information described above. For example, in 330, if there is a SCS restriction, the techniques described above with regard to 315 may be utilized for PDCCH reception. If there is no SCS restriction, the techniques described above with regard to 320 may be utilized for PDCCH reception.

In 325, if overbooking is permitted, the method 300 continues to 335. In some exemplary embodiments, overbooking may only be permitted on the sSCell per scheduled SpCell. For example, the number of BDs and CCEs on the SpCell may be smaller than or equal to the BD and CCE limits (e.g., the computed BD and CCE values). However, the sum of the number of BDs and CCEs on the SpCell and the SCell may exceed the total blind decode and CCE limit.

In other exemplary embodiments, overbooking may be allowed on the SpCell, the SCell or both. For example, the number of BDs and CCEs on the SpCell may exceed the BD and CCE limit, the number of BDs and CCEs on the SCell may exceed the BD and CCE limit and the sum of the number of BDs and CCEs on the SpCell and the SCell may exceed the BD and CCE limit.

Figure 5:
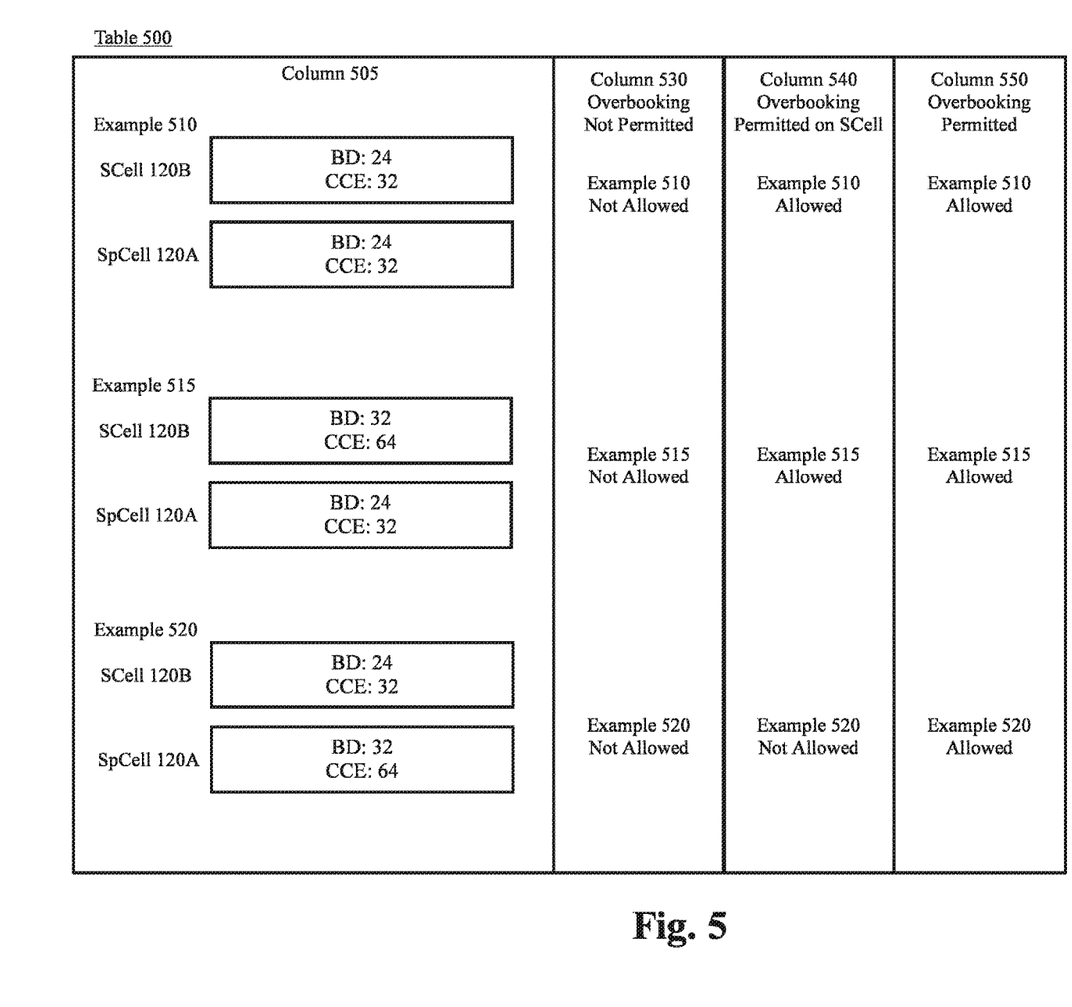
FIG. 5 shows a table illustrating multiple overbooking configurations according to various exemplary embodiments.

FIG. 5 shows a table 500 illustrating multiple overbooking configurations according to various exemplary embodiments. The table 500 assumes, when a SpCell is configured to be scheduled by the SpCell itself and an SCell, a BD limit of 44 and a CCE limit 56 may be utilized.

The table 500 includes a first column 505 that illustrates three examples 510-520. Example 510 shows a SCell configured with 24 blind decodes and 32 CCE and a SpCell configured with 24 blind decodes and 32 CCE. Example 515 shows a SCell 120B configured with 32 BDs and 64 CCEs and a SpCell 120A configured with 24 BDs and 32 CCEs. Example 520 shows a SCell 120B configured with 24 BDs and 32 CCEs and a SpCell configured with 32 BDs and 64 CCEs 515.

Column 530 illustrates whether the examples 510-520 would be permitted when overbooking is not permitted and the sum of the BDs and CCEs for each cell were considered for SpCell scheduling when both the SpCell 120A and the SCell 120B are configured to schedule the SpCell 120A. In each example 510-520, the sum of the BDs and the CCEs would exceed the assumed blind decode and CCE limits and thus, none of the examples 510-520 would be allowed if overbooking was not permitted.

Column 540 illustrates whether the examples 510-520 would be permitted if overbooking was only permitted on the SCell per scheduled SpCell when both the SpCell 120A and the SCell 120B are configured to schedule the SpCell 120A. Thus, the number of BDs and the number of CCEs on the SpCell 120A may be smaller than or equal to the BD and CCE limits referenced above. However, the sum of the number of BDs and CCE on the SpCell 120A and the SCell 120B may exceed the total BD and CCE limits reference above.

Column 540 shows that example 510 is allowed under this approach. Here, the number of BDs and CCEs associated with the SpCell 120A is less than the assumed BD and CCE limit (e.g., 44 and 56) and the sum of the BDs and CCEs across the SCell 120B exceed the assumed BD and CCE limit.

The column 540 shows that example 515 is allowed under this approach. Here, the number of BDs and CCEs associated with the SpCell 120B is less than the assumed BE and CCE limit (e.g., 44 and 56). The sum number of BDs and CCEs across the SpCell 120A and the SCell 120B exceed the assumed BD and CCE limit, however, this type of overbooking is permitted in this approach.

The column 540 also shows that example 520 would not be allowed under this approach. Here, the number of BDs and CCE associated with the SpCell 120A is more than the assumed BD and CCE limit (e.g., 44 and 56). This type of overbooking is not permitted under this approach and thus, the sum of the BDs and CCEs across the SCell 120B and the SpCell 120A is irrelevant to the example 520.

The column 550 illustrates whether the examples 510-520 are allowed when overbooking is permitted on the SpCell and the SCell. Thus, the number of BDs and the number of CCEs on the SpCell 120A may be greater than the BD and CCE limits referenced above, the number of BDs and the number of CCEs on the SCell 120B may be greater than the BD and CCE limits referenced above and the sum of the number of BDs and CCE on the SpCell 120A and the SCell 120B may exceed the total BD and CCE limits reference above. When using this approach, all of the examples 510-520 are allowed because overbooking is permitted on any of the cells.

Returning to the method 300, in 335, the UE 110 may implement one or more dropping rules for BD and CCE overbooking. In some embodiments, when implementing dropping rules for excessively configured BDs and CCEs, the BDs and CCEs configured in the common search space (CSS) in both the SCell and the SpCell may be subtracted from the limit of the maximum number of BDs and CCEs per scheduled SpCell. Thus, BDs and CCEs configured in the CSS may be less likely to be dropped by the UE 110.

In some exemplary embodiments, BD and CCE dropping may be performed based on the UE-specific search space (USS). In one approach, the configured USS may be configured in a prioritized ordered based on the ascending order of the search space set index corresponding to the SpCell 120A and then the search space set index corresponding to the SCell 120B. To provide an example, a prioritized order that includes 4 USS per cell would include: {SpCell USS1}, {SpCell USS2}, {SpCell USS3}, {SpCell USS4}, {SCell USS1}, {SCell USS2}, {SCell USS3}, {SCell USS4}. Alternatively, the configured search spaces may be ordered in the ascending order of the search space set index corresponding to the SCell 120B and then the search space set index corresponding to the SpCell 120A. To provide an example, a prioritized order that includes 4 USS per cell would include: {SCell USS1}, {SCell USS2}, {SCell USS3}, {SCell USS4}, {SpCell USS1}, {SpCell USS2}, {SpCell USS3}, {SpCell USS4}.

The prioritized order of the USS may be compared to a value (z) representing the difference between the i) the number BDs and CCEs configured in a CSS in both the SCell 120B and the SpCell 120A and ii) the limit of the maximum number of BDs and CCEs per scheduled SpCell. The USS associated with the lowest priority may be dropped to ensure that the number of BDs and CCEs to be performed by the UE 110 does not exceed (z). In some exemplary embodiments, the search spaces appearing towards the beginning of the prioritized list may be associated with the lowest priority and the search spaces appearing towards the end of the list may be associated with the highest priority.

In another approach, the configured USS may be configured in a prioritized order based on alternating between the ascending order of the search space set index associated with the cells. To provide an example, a prioritized order that includes 4 USS per cell would include: {SpCell USS1}, {SCell USS1}, {SpCell USS2}, {SCell USS2}, {SpCell USS3}, {SCell USS3}, {SpCell USS4}, {SCell USS4}. Alternatively, the USS may be ordered using the SCell first and then alternating between search space indexes. To provide an example, a prioritized order that includes 4 USS per cell would include: {SCell USS1}, {SpCell USS1}, {SCell USS2}, {SpCell USS2}, {SCell USS3}, {SpCell USS3}, {SCell USS4}, {SpCell USS4}.

The prioritized order of the USS may be compared to a parameter value (z) representing the difference between i) the number of BDs and CCEs configured in the CSS for both the SCell 120B and the SpCell 120A and ii) the limit of the maximum number of BDs and CCEs per scheduled SpCell. The USS associated with the lowest priority may be dropped to ensure that the number of BDs and CCEs to be performed by the UE 110 does not exceed (z). In some embodiments, the search spaces appearing towards the beginning of the prioritized list may be associated with the lowest priority and the search spaces appearing towards the end of the list may be associated with the highest priority.

In some exemplary embodiments, the USS associated with the lowest priority may be dropped to ensure that the number of BDs and CCEs to be performed by the UE 110 does not exceed a BD and CCE limit. In some exemplary embodiments, the search spaces appearing towards the beginning of the USS list may be associated with the lowest priority and the search spaces appearing towards the end of the USS list may be associated with the highest priority.

In some exemplary embodiments, when the SpCell 120A and the SCell 120B are configured to schedule the SpCell 120A and overbooking occurs on the SpCell 120A, the USS is only allowed to be configured on the SCell 120B (e.g., sSCell). This USS restriction is an example of a restriction that when implemented within the context of the exemplary functionality described herein provides an opportunity for a reasonable tradeoff between network scheduling flexibility and UE complexity.

In some exemplary embodiments, when the SpCell 120A and the SCell 120B are configured to schedule the SpCell 120A and overbooking occurs on the SpCell 120A, there may be two different approaches for CSS handling. In a first approach, the BDs and CCEs configured in the CSS in both the SCell 120B and the SpCell 120A are subtracted from the maximum number of BDs and CCEs per scheduled SpCell. In a second approach, the BDs and CCEs configured in the CSS in the SCell 120B may be subtracted from the maximum number of BDs and CCEs per scheduled SpCell. For USS handling on the SCell 120B, the search spaces may be ordered based on their search space index (e.g., ascending, descending, etc.). The search space associated with the lowest priority (e.g., towards the beginning of the list or towards the end of the list) may be dropped to reduce the number of BS and CCEs for the UE 110.

In 330, the UE 110 performs PDCCH reception based on the configuration information described above. For example, in 330, if there is a SCS restriction, the techniques described above with regard to 315 may be utilized for PDCCH reception. If there is no SCS restriction, the techniques described above with regard to 320 may be utilized for PDCCH reception. In addition, if overbooking is permitted the techniques described above with regard to 335 may be utilized. Subsequently, the method 300 ends.

Another exemplary technique for implementing a SpCell that may be scheduled by the SpCell and an SCell relates to how the exemplary SpCell may be considered for BD and CCE computation within the context of CA. Under conventional circumstances, a parameter is used to control the scale of the BD and CCE limits with regard to the number of CCs. This parameter may be referred to as a pdcch-BlindDetectionCA parameter and signaled by the UE 110 to the network.

The above referenced examples are described with regard to BD and CCE limits that are based on a single component carrier (CC). However, since the SpCell 120A may now be scheduled by two cells, it is important to consider how this may affect BD and CCE computation when a SpCell may be scheduled by the SpCell itself and an SCell within the context of CA.

When another CC is added to the connection, the UE 110 and the network should have a common understanding with regard to how the number of CCs is to affect the PDCCH BD and CCE configuration. Generally, as the number of CCs increases, the number of potential PDCCH candidates increases as well. However, the pdcch-BlindDetectionCA may restrict this factor to a certain value. For example, if the pdcch-BlindDetectionCA parameter is set to a value of 4 and the UE 110 is configured with 4 or less CCs, the UE 110 may be configured to support a linear scale of BDs and CCEs, e.g., 1× for one CC, 2× for two CCs, 3× for three CCs and 4× for four CCs. However, if the number of CCs exceeds this scaling parameter (e.g., five or more), the UE 110 may be configured to support the parameter value (e.g., 4) multiplied by the number of BDs and CCEs configured per CC and then spread the BDs and CCEs evenly (or in any other appropriate arrangement) among the CCs.

In one approach, compared to the UE 110 reported pdcch-BlindDetectionCA parameter, the SpCell 120A may be considered as one cell. In another approach, compared to the UE 110 reported pdcch-BlindDetectionCA parameter, the SpCell 120A may be considered as two cells. With these approaches, whether the SpCell 120A is considered as one cell or two cells may be hard encoded into the Standard. In alternative approach, the UE 110 may report capability information that explicitly or implicitly indicates how many cells that the SpCell 120A should be considered as (e.g., 1 or 2) for CA blind detection and CCE channel estimation.

Another exemplary technique relates to physical uplink control channel (PUSCH) processing when both the SpCell 120A and the SCell 120B are configured to schedule the SpCell 120A. In NR, the UE 110 may support different processing time capabilities or processing types (e.g., processing capability 1 and processing capability 2). Those skilled in the art will understand that processing capability 2 relates to low latency processes and instructs the UE 110 to implement a higher turnaround time.

In some embodiments, PUSCH processing capability 2 may not be configured to schedule the SpCell 120A from either the SpCell 120A or the SCell 120B. In other embodiments, PUSCH processing capability 2 may not be configured to schedule the SpCell 120A from the SCell 120B but may be permitted to schedule the SpCell 120A from the SpCell 120A. These restrictions may enable an operator to satisfy DSS requirements and do not place unreasonable requirements on either the UE or the network.

Another exemplary technique for implementing a SpCell that may be configured by a SpCell and an SCell relates to determining the number of unicast DCI expected to be decoded within a SpCell monitoring occasion (e.g., slot) when multiple cells are configured to schedule the SpCell. In some exemplary embodiments, when the SpCell 120A and SCell 120B are configured to schedule the SpCell 120A, the number of unicast DCI per slot to be decoded by the UE 110 may be based on a sum of a maximum number of unicast DCI corresponding to the SpCell 120A and a maximum number of unicast DCI corresponding to the SCell 120B. In other exemplary embodiments, when the SpCell 120A and SCell 120B are configured to schedule the SpCell 120A, an independent maximum number from either the maximum number of unicast DCI corresponding to the SpCell 120A or the maximum number of unicast DCI corresponding to the SCell 120B may be considered.

When the SpCell 120A and the SCell 120B are configured to schedule the SpCell 120A and the combined number of unicast DCI for both the SpCell 120A and the SCell 120B per slot is configured, three approaches different approaches may be implemented that consider SCS.

Figure 6:
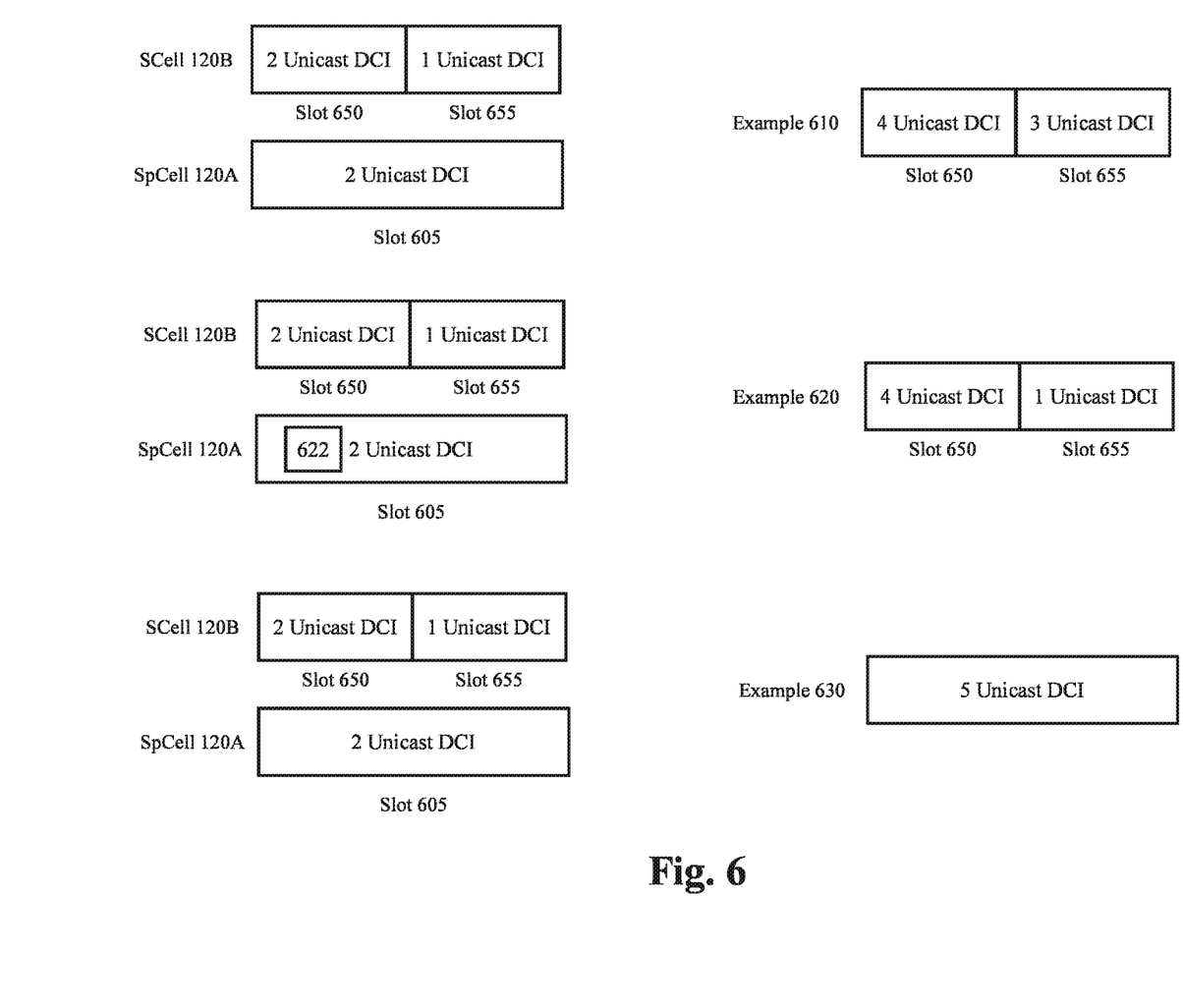
FIG. 6 shows three options for configuring a number of unicast DCI when the SpCell and the SCell have different SCS according to various exemplary embodiments.

FIG. 6 shows three options for configuring a number of unicast DCI when the SpCell and the SCell have different SCS according to various exemplary embodiments. In FIG. 6, the UE 110 is configured with a number of unicast DCI per slot 650, 655 on the SCell 120B. The UE 110 is also configured with a number of unicast DCI per slot 605 on the SpCell 120A. However, since the SCS is different, the slot 605 for the SpCell 120A is longer than the individual slots 450, 455 of the SCell 120B. Those skilled in the art will understand that a longer slot is associated with a smaller SCS and a smaller slot is associated with a larger SCS.

In FIG. 6, the SCell 120B includes two unicast DCI on slot 650 and one unicast DCI on slot 655. In addition, the SpCell 120A includes two unicast DCI on slot 605. The examples shown in FIG. 6 are merely provided for illustrative purposes and are not intended to limit the exemplary embodiments in any way.

In a first approach, the larger SCS (e.g., shorter slot) between the two cells may be used to determine the number of unicast DCI when the SpCell is configured to be scheduled by the SpCell and the SCell. In this approach, the number of unicast DCI in the longer slot is repeatedly counted in the shorter slots. The example 610 illustrates this approach. In the example 610, the UE 110 may perform PDCCH reception based on a SCS associated with the larger SCS (e.g., smaller slots 650, 655) and the sum of the unicast DCI among the SpCell 120A and the SCell 120B per slots 650, 655. Thus, in the example 610, there are 4 unicast DCI in slot 650 and 3 unicast DCI in slot 655.

In a second approach, in addition to the larger SCS, the presence of a search space may be considered for unicast DCI. For illustrative purposes, the slot 605 is shown to include a search space 622. In this approach, the number of unicast DCI within the longer slot may be counted when the corresponding search space overlaps with one of the shorter slots when an SpCell is configured to be scheduled by the SpCell and the SCell. The example 420 illustrates this approach. In the example 420, the UE 110 performs PDCCH reception based on a SCS associated with the larger SCS (e.g., smaller slots 450, 455). In the example 420, slot 450 is shown as being considered to include the sum of the unicast DCI for the SCell 120B and the SpCell 120A, e.g., 4 unicast DCI. The slot 455 is considered to include the unicast DCI from just the SCell 120B, e.g., 1 unicast DCI, since there is no overlapping search space.

In a third approach, the smaller SCS (e.g., longer slot) may be used for unicast DCI when the SpCell is configured to be scheduled by the SpCell and the SCell. The example 430 illustrates this approach. In the example 430, the UE 110 performs PDCCH reception based on a SCS associated with the smaller SCS (e.g., longer slot 605) and the sum of the BDs and CCEs associated with both the SpCell 120A and the SCell 120B over the monitoring occasion (e.g., all three slots 405, 450, 455). Thus, in the example 430, there are five unicast DCI.

EXAMPLES

In a first example, a user equipment (UE) comprising a transceiver configured to communicate with a network and a processor communicatively coupled to the transceiver and configured to perform operations is provided. The operations include determining that the UE is connected to a special cell (SpCell) that is configured to schedule the SpCell and a secondary cell (SCell) that is configured to schedule the SpCell, determining a number of blind decodes (BDs) and a number of control channel elements (CCEs) that may be configured for the SpCell and monitoring a physical downlink control channel (PDCCH) for downlink control information (DCI) scheduling the SpCell that is transmitted by the SpCell and DCI scheduling the SpCell that is transmitted by the SCell.

In a second example, the UE of the first example, wherein a first subcarrier spacing (SCS) corresponding to the SpCell and a second SCS corresponding to the SCell are the same SCS.

In a third example, the UE of the first example, wherein the number of BDs and the number of CCEs are based on a sum of i) a number of BDs and CCEs corresponding to a SpCell monitoring occasion and ii) a number of BDs and CCEs corresponding to a SCell monitoring occasion.

In a fourth example, the UE of the first example, wherein the number of BDs and the number of CCEs is based on i) a maximum number among a number of BDs and CCEs corresponding to a SpCell monitoring occasion and a number of BDs and CCEs corresponding to a SCell monitoring occasion, ii) only the number of BDs and CCEs corresponding to the SpCell monitoring occasion or iii) only the number of BDs and CCEs corresponding to the SCell monitoring occasion.

In a fifth example, the UE of the first example, wherein a first subcarrier spacing (SCS) corresponding to the SpCell and a second SCS corresponding to the SCell are not the same SCS.

In a sixth example, the UE of the fifth example, wherein the number of BDs and the number of CCEs is based on a larger SCS between the first SCS and the second SCS.

In a seventh example, the UE of the sixth example, wherein the number of BDs and the number of CCEs includes a number of BDs and CCEs within a slot of a first cell only when a corresponding search space overlaps in time with a slot of a second cell.

In an eighth example, the UE of the fifth example, wherein the number of BDs and the number of CCEs based on a smaller SCS between the first SCS and the Second SCS.

In a ninth example, the UE of the first example, the operations further comprising identifying that a network has overbooked BDs or CCEs for a SpCell monitoring occasion and applying a dropping rule to a UE specific search space (USS), wherein monitoring the PDCCH includes utilizing the dropping rule.

In a tenth example, the UE of the ninth example, wherein applying the dropping rule includes subtracting a number of BDs and CCEs configured in a common search space (CSS) in both the SpCell and the SCell from a maximum number of BDs and CCEs per SpCell monitoring occasion and then evaluating the USS.

In an eleventh example, the UE of the ninth example, wherein applying the dropping rule includes subtracting a number of BDs and CCEs configured in a common search space (CSS) in the SCell from a maximum number of BDs and CCEs per SpCell monitoring occasion and then evaluating a number of BDs and CCEs in the CSS in the SpCell and the USS.

In a twelfth example, the UE of the ninth example, wherein applying the dropping rule includes determining a search space index corresponding to the USS of the SCell and the USS of the SpCell.

In a thirteenth example, the UE of the ninth example, wherein applying the dropping rule includes determining a search space index corresponding to the USS of the SCell.

In a fourteenth example, the UE of the ninth example, wherein applying the dropping rule includes ordering multiple USS corresponding to the SpCell and then multiple USS corresponding to the SCell.

In a fifteenth example, the UE of the ninth example, wherein applying the dropping rule includes ordering multiple USS corresponding to the SCell and then multiple USS corresponding to the SpCell.

In a sixteenth example, the UE of the ninth example, wherein applying the dropping rule includes ordering multiple USS corresponding to the SCell and multiple USS corresponding to the SpCell in an alternating manner based on a search space index.

In a seventeenth example, the UE of the first example, the operations further comprising transmitting capability information to the network indicating a number of cells associated with the SpCell that is to be considered for a total number of BDs and CCEs the UE supports across all component carriers (CCs) when carrier aggregation (CA) is configured.

In an eighteenth example, the UE of the first example, the operations further comprising determining a number of unicast downlink control information (DCI) per slot.

In a nineteenth example, the UE of the eighteenth example, wherein the number of unicast DCI is based on a combined maximum number of unicast DCI corresponding to the SpCell and the SCell.

In a twentieth example, the UE of the eighteenth example, wherein the number of unicast DCI is based on one of a maximum number of unicast DCI corresponding to the SpCell and a maximum number of unicast DCI corresponding to the SCell.

In a twenty first example, the UE of the eighteenth example, wherein a first subcarrier spacing (SCS) corresponding to the SpCell and a second SCS corresponding to the SCell are not the same SCS.

In a twenty second example, the UE of the twenty first example, wherein the first SCS is larger than the second SCS and the number unicast DCI is based on the first SCS.

In a twenty third example, the UE of the twenty first example, wherein the first SCS is smaller than then second SCS and the number of DCI is based on the first SCS.

In a twenty fourth example, the UE of the eighteenth example, wherein the number of unicast DCI includes unicast DCI within a slot of a first cell only when a corresponding search space overlaps in time with a slot of a second cell.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations comprising:
    determining that the UE is connected to a special cell (SpCell) that is configured to schedule the SpCell and a secondary cell (SCell) that is configured to schedule the SpCell;
    determining a number of blind decodes (BDs) and a number of control channel elements (CCEs) that are capable of being configured for the SpCell;
    identifying that a network has overbooked BDs or CCEs for a SpCell monitoring occasion;

applying a dropping rule to a UE specific search space (USS) that includes subtracting a number of BDs and CCEs configured in a common search space (CSS) in both the SpCell and the SCell from a maximum number of BDs and CCEs per SpCell monitoring occasion and then evaluating the USS; and monitoring a physical downlink control channel (PDCCH) for downlink control information (DCI) scheduling the SpCell that is transmitted by the SpCell and DCI scheduling the SpCell that is transmitted by the SCell, wherein monitoring the PDCCH includes utilizing the dropping rule.

2. The processor of claim 1, wherein a first subcarrier spacing (SCS) corresponding to the SpCell and a second SCS corresponding to the SCell are the same SCS.

3. The processor of claim 1, wherein the number of BDs and the number of CCEs are based on a sum of i) a number of BDs and CCEs corresponding to a SpCell monitoring occasion and ii) a number of BDs and CCEs corresponding to a SCell monitoring occasion.

4. The processor of claim 1, wherein the number of BDs and the number of CCEs is based on i) a maximum number among a number of BDs and CCEs corresponding to a SpCell monitoring occasion and a number of BDs and CCEs corresponding to a SCell monitoring occasion, ii) only the number of BDs and CCEs corresponding to the SpCell monitoring occasion or iii) only the number of BDs and CCEs corresponding to the SCell monitoring occasion.

5. The processor of claim 1, wherein a first subcarrier spacing (SCS) corresponding to the SpCell and a second SCS corresponding to the SCell are not the same SCS.

6. The processor of claim 5, wherein the number of BDs and the number of CCEs is based on a larger SCS between the first SCS and the second SCS.

7. The processor of claim 5, wherein the number of BDs and the number of CCEs based on a smaller SCS between the first SCS and the Second SCS.

8. The processor of claim 1, the operations further comprising:
transmitting capability information to the network indicating a number of cells associated with the SpCell that is to be considered for a total number of BDs and CCEs the UE supports across all component carriers (CCs) when carrier aggregation (CA) is configured.

9. The processor of claim 1, the operations further comprising:
determining a number of unicast downlink control information (DCI) per slot.

10. The processor of claim 9, wherein the number of unicast DCI is based on a combined maximum number of unicast DCI corresponding to the SpCell and the SCell.

11. The processor of claim 9, wherein the number of unicast DCI is based on one of a maximum number of unicast DCI corresponding to the SpCell and a maximum number of unicast DCI corresponding to the SCell.

12. A user equipment (UE), comprising:
a transceiver configured to communicate with a network; and
a processor communicatively coupled to the transceiver and configured to perform operations comprising:

determining that the UE is connected to a special cell (SpCell) that is configured to schedule the SpCell and a secondary cell (SCell) that is configured to schedule the SpCell;

determining a number of blind decodes (BDs) and a number of control channel elements (CCEs) that are capable of being configured for the SpCell;

identifying that a network has overbooked BDs or CCEs for a SpCell monitoring occasion;

applying a dropping rule to a UE specific search space (USS) that includes subtracting a number of BDs and CCEs configured in a common search space (CSS) in both the SpCell and the SCell from a maximum number of BDs and CCEs per SpCell monitoring occasion and then evaluating the USS; and monitoring a physical downlink control channel (PDCCH) for downlink control information (DCI) scheduling the SpCell that is transmitted by the SpCell and DCI scheduling the SpCell that is transmitted by the SCell, wherein monitoring the PDDCH includes utilizing the dropping rule.

13. The UE of claim 12, wherein a first subcarrier spacing (SCS) corresponding to the SpCell and a second SCS corresponding to the SCell are the same SCS.

14. The UE of claim 12, wherein the number of BDs and the number of CCEs are based on a sum of i) a number of BDs and CCEs corresponding to a SpCell monitoring occasion and ii) a number of BDs and CCEs corresponding to a SCell monitoring occasion.

15. The UE of claim 12, wherein the number of BDs and the number of CCEs is based on i) a maximum number among a number of BDs and CCEs corresponding to a SpCell monitoring occasion and a number of BDs and CCEs corresponding to a SCell monitoring occasion, ii) only the number of BDs and CCEs corresponding to the SpCell monitoring occasion or iii) only the number of BDs and CCEs corresponding to the SCell monitoring occasion.

16. The UE of claim 12, wherein a first subcarrier spacing (SCS) corresponding to the SpCell and a second SCS corresponding to the SCell are not the same SCS.

17. The UE of claim 16, wherein the number of BDs and the number of CCEs is based on a larger SCS between the first SCS and the second SCS.

18. The UE of claim 16, wherein the number of BDs and the number of CCEs based on a smaller SCS between the first SCS and the Second SCS.

19. The UE of claim 12, the operations further comprising:
transmitting capability information to the network indicating a number of cells associated with the SpCell that is to be considered for a total number of BDs and CCEs the UE supports across all component carriers (CCs) when carrier aggregation (CA) is configured.

20. The UE of claim 12, the operations further comprising:
determining a number of unicast downlink control information (DCI) per slot.

* * * * *